United States Patent [19]

Wheatley et al.

[11] Patent Number: 5,482,322
[45] Date of Patent: Jan. 9, 1996

[54] VEHICLE WITH WHEEL TOE DEVICE

[75] Inventors: Donald G. Wheatley, Ann Arbor; Ronald M. Campbell, Northville, both of Mich.

[73] Assignee: Ford Motor Company, Dearborn, Mich.

[21] Appl. No.: 293,345

[22] Filed: Aug. 18, 1994

[51] Int. Cl.$^6$ ..................................... B62D 21/00
[52] U.S. Cl. .......................... 280/784; 180/274; 180/311; 280/661
[58] Field of Search ................... 280/661, 784; 180/274, 311

[56] References Cited

U.S. PATENT DOCUMENTS

| | | | |
|---|---|---|---|
| 3,498,630 | 3/1970 | Crawford | 280/661 |
| 3,794,342 | 2/1974 | Froumajou et al. | |
| 3,881,742 | 5/1975 | Felzer | 280/784 |
| 4,090,721 | 5/1978 | Wedin et al. | |
| 5,275,436 | 1/1994 | Pomero | 280/784 |

FOREIGN PATENT DOCUMENTS

| | | | |
|---|---|---|---|
| 502799 | 9/1992 | European Pat. Off. | 280/784 |
| 2853965 | 7/1980 | Germany. | |
| 3800944 | 1/1989 | Germany. | |
| 608161 | 1/1985 | Japan. | |

*Primary Examiner*—Eric D. Culbreth
*Attorney, Agent, or Firm*—Gregory P. Brown; Roger L. May

[57] ABSTRACT

A vehicle including a vehicle frame having a pair of longitudinally extending support rails disposed in spaced relationship with respect to one another and terminating at one end proximal to a front of the vehicle, at least one pair of wheels and a steering mechanism operatively connected to the wheels for controlling the direction of the vehicle in response to driver input through the steering mechanism, the steering mechanism including a pair of tie rods operatively connected to the wheels to control the rotation of the wheels about a vertical axis, and a pair of tie rod impact members fixedly mounted to the support rails and movable in a direction substantially longitudinally along the support rails in response to a predetermined force acting on the vehicle such that the tie rod impact members engage the tie rods to cause the wheels to rotate about a vertical axis independent of driver input through the steering mechanism.

10 Claims, 3 Drawing Sheets

5,482,322

VEHICLE WITH WHEEL TOE DEVICE

BACKGROUND OF THE INVENTION

1. Field of the Invention

The present invention relates generally to vehicles and, more specifically, to a vehicle with a device to toe wheels of the vehicle toward one another in the event of an impact or collision of sufficient predetermined force on the vehicle.

2. Description of the Related Art

It is known that vehicles such as automotive vehicles may collide with another vehicle or with some structure which can damage the vehicle. As a result, automotive vehicles are designed to contain an occupant(s) in an occupant compartment of the vehicle in the unfortunate event of a collision or impact on the vehicle. One of the design parameters of the automotive vehicle is to minimize possible G-force loading on the occupant in the event of a collision. One of the ways to accomplish this is to maximize, to the extent practical, the amount of space in the occupant compartment that the occupant can "ride down" during a collision such that the occupant's deceleration rate is lowered.

It is also known that automotive vehicles have wheels disposed at a forward position, relatively speaking, on such vehicles. In the event of a substantial impact, the disposition of the wheels can be a factor in the deceleration rate of the occupants in the vehicle. Since the wheels are relatively stiff, they can increase the deceleration rate for the occupants if the collision is severe and if the wheels are disposed substantially perpendicular to the object with which the vehicle collides. As a result, there is a need to reduce the factor created by the wheels in a collision scenario in order to lower the deceleration rate of the occupant in the event of a substantial collision on the vehicle.

SUMMARY OF THE INVENTION

Accordingly, the present invention is a vehicle including a vehicle frame having a pair of longitudinally extending support rails disposed in spaced relationship with respect to one another and terminating at one end proximal to a front of the vehicle. The vehicle includes at least one pair of wheels and a steering mechanism operatively connected to the wheels for controlling the direction of the vehicle in response to driver input through the steering mechanism. The steering mechanism includes a pair of tie rods operatively connected to the wheels to control the rotation of the wheels about a vertical axis. The vehicle further includes a pair of tie rod impact members fixedly mounted to the support rails and movable in a direction substantially longitudinally along the support rails in response to a predetermined force acting on the vehicle such that the tie rod impact members engage the tie rods to cause the wheels to rotate about a vertical axis independent of driver input through the steering mechanism.

One feature of the present invention is that a vehicle is provided with a wheel toe device. Another feature of the present invention is that, in the event of a collision of a predetermined magnitude, the wheels or tires are toed toward one another by the wheel toe device such that they are no longer aligned with the direction of travel of the vehicle and are therefore disposed in an angular position relative to the object of impact. Yet another feature of the present invention is that the stiffness of the wheels of the vehicle has less of an effect in the deceleration rate of the vehicle and therefore the occupants thereof by allowing the vehicle frame and surrounding structural members to absorb more energy during a collision.

Other features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
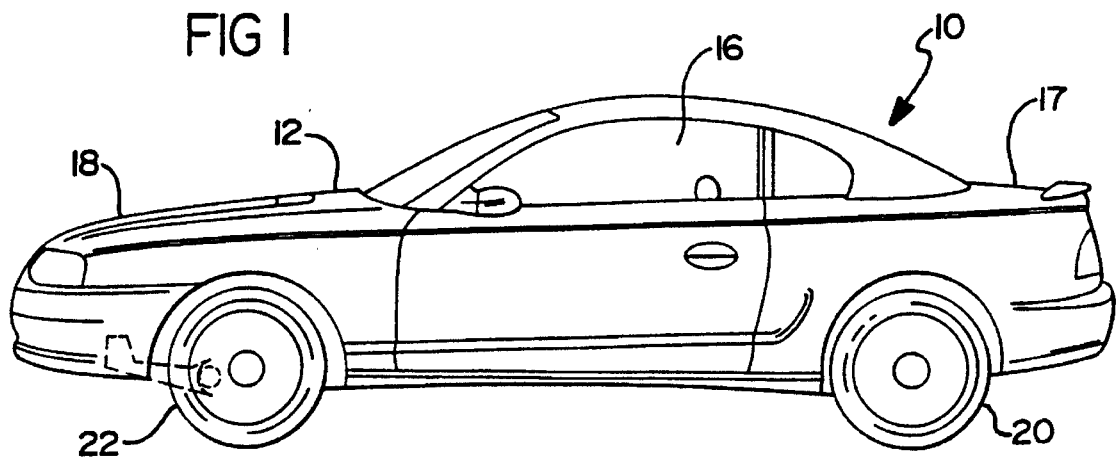
FIG. 1 is a side view of a vehicle with a wheel toe device according to the present invention.
Figure 2:
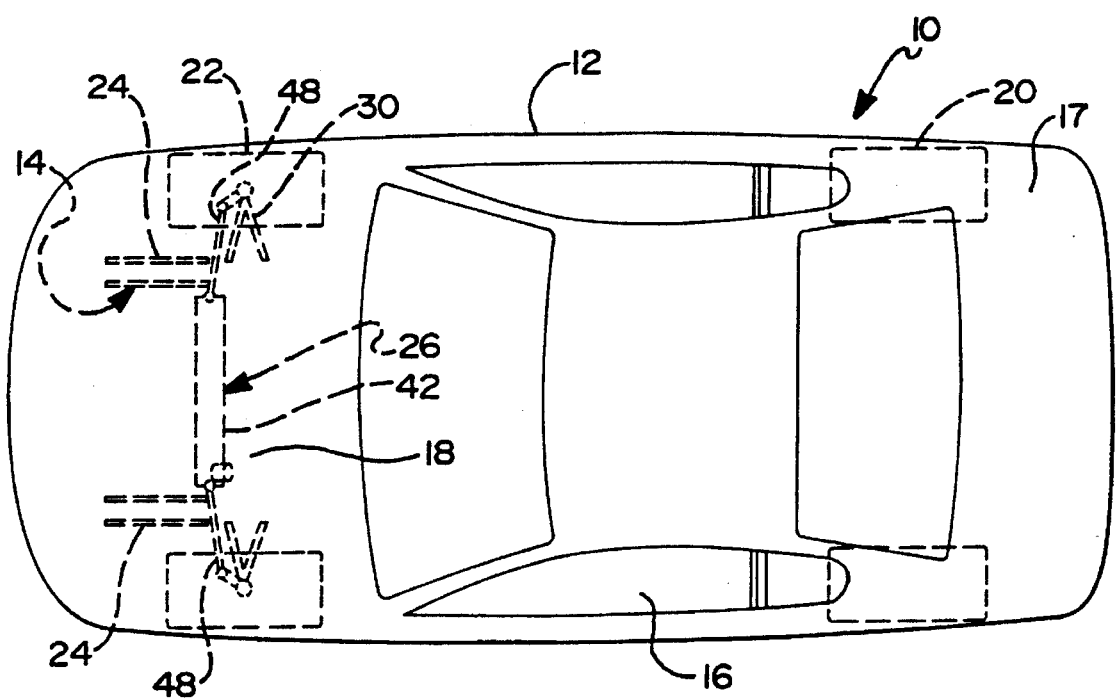
FIG. 2 is a top view of the vehicle of FIG. 1.

Referring to the drawings and in particular to FIGS. 1 and 2, one embodiment of a vehicle 10 with a wheel toe device, according to the present invention, is shown. The vehicle 10 includes a vehicle body 12 supported on a vehicle frame, generally indicated at 14. Together, the vehicle body 12 and vehicle frame 14 define an occupant compartment 16, a trunk or storage compartment 17, typically located at a rear of the vehicle 10 and an engine compartment 18 located at a front of the vehicle 10. It should be appreciated that the arrangement of the components of the vehicle 10 relative to each other may differ.

The vehicle 10 generally includes two sets of wheels such as a pair of rear wheels 20 and a pair of front wheels 22. The vehicle frame 14 may be configured in any suitable manner to fit the vehicle body 12 and generally includes a pair of longitudinally extending support rails 24 disposed in spaced parallel relationship with respect to one another. The support rails 24 terminate at one end proximal to the front of the vehicle 10. The support rails 24 may be formed from stamped or extruded steel, aluminum, magnesium or other energy absorbing materials.

Figure 3:
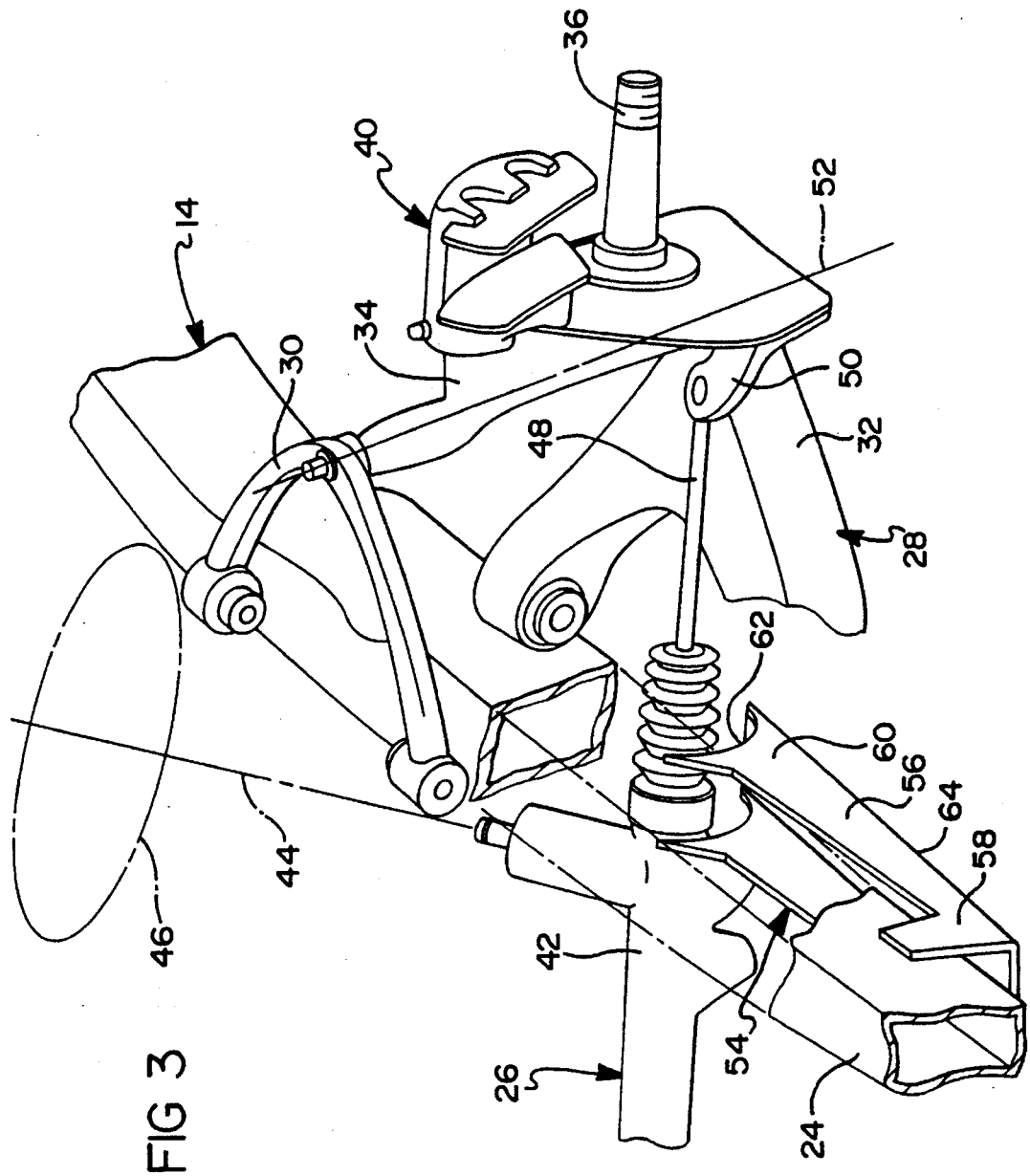
FIG. 3 is a partial perspective view of a portion of the vehicle of FIG. 1.

Referring to FIGS. 2 and 3, the vehicle 10 also includes a steering mechanism, generally indicated at 26, operatively connected to the front wheels 22. The steering mechanism 26 controls the direction of the vehicle 10 in response to driver input. As best shown in FIGS. 2 through 5, the front wheels 22 are located on opposite sides of the support rails 24. The steering mechanism 26 is preferably of a rack and pinion type. One portion of the steering mechanism 26 corresponding to a left front portion of the vehicle 10 is illustrated FIG. 3. It will be appreciated that similar structure is employed corresponding to a right front portion of the vehicle 10 and, therefore, only one side of the steering mechanism 26 and the present invention will be described in detail in connection with FIG. 3.

The vehicle 10 further includes a suspension system, generally indicated at 28, interconnecting the front wheels 22 and the vehicle frame 14. The suspension system 28 includes an upper suspension arm 30, a lower suspension arm 32 and a spindle 34 operatively connected there between. The suspension system 28 also includes a wheel hub mounting shaft 36 supported by the spindle 34 and one of the front wheels 22 (not shown in FIG. 3) is mounted for rotation on the mounting shaft 36. The vehicle 10 may also include a brake system, generally indicated at 40, mounted on the spindle 34 as is commonly known in the art for braking of the wheels 22.

The steering mechanism 26 includes a rack and pinion steering gear housing 42 in which inner workings of the steering mechanism 26 are housed and are operatively connected through a shaft 44 to a steering wheel 46, both of which are shown in phantom in FIG. 3. The steering mechanism 26 also includes a pair of tie rods 48, one of which is shown in FIG. 3, operatively connected to the front wheels 22 through a spindle arm 50 of the spindle 34. The tie rods 48 extend in a direction substantially transverse to one of the support rails 24. The tie rods 48 together with the other elements of the steering mechanism 26 control the rotation of the front wheels 22 about a wheel pivot or vertical axis 52. It should be appreciated that the vehicle 10 is steered by the steering mechanism 26 and front wheels 22 through input from a driver of the vehicle 10.

The vehicle 10 further includes a wheel toe device, according to the present invention, such as a pair of tie rod impact members, generally indicated at 54. One tie rod impact member 54 is fixedly mounted to both of the support rails 24. The tie rod impact members 54 are movable in a direction substantially longitudinal along the support rails 24 in a rearward direction relative to the vehicle 10 in response to a predetermined impact force acting on the vehicle 10. Such an impact force may occur in the event of a collision. In this case, the tie rod impact members 54 will engage the tie rods 48 to cause the front wheels 22 to rotate about the vertical axis 52 independent of the driver input. More specifically, each of the tie rod impact members 54 are capable of engagement with one of the tie rods 48 to cause deformation thereof in response to the predetermined impact force acting on the vehicle 10 to rotate the front wheels 22 about the vertical axis 52 and toward one another. It should be appreciated that, when the spindle arm 50 and tie rod 48 are disposed forward of the vertical axis 52, the bending of the tie rod 48 will rotate the front wheels 22 such that a forward portion of the front wheels 22 move toward each other. This is typically referred to in the art as "toe-in". If, however, the tie rods 48 are located to the rear of the vertical axis 52, the front wheels 22 will rotate such that a forward portion of the front wheels 22 move away from each other. This is typically referred to in the art as "toe-out". In either case, the front wheels 22 move toward each other. As such, both conditions will be generally referred to as "toe-in".

The tie rod impact members 54 have a substantially U-shaped channel body 56 conforming to the underside of the support rails 24 with forward and rearward ends 58 and 60 relative to the vehicle 10. The rearward end 60 of the body 56 terminates in an arcuate impact surface 62 spaced from the tie rods 48 during normal driving conditions. However, the impact surface 62 is aligned so as to engage each of the tie rods 48 causing deformation of the same when the tie rod impact members 54 are moved longitudinally along the support rails 24 and rearwardly relative to the vehicle 10 in the event of a collision as illustrated, for example, in FIGS. 4 and 5.

The body 56 of the tie rod impact members 54 has an increased thickness from the forward end 58 to the rearward end 60 so as to present an underside ramp surface 64. The underside ramp surface 64 of the body 56 also serves to deflect foreign articles from inadvertent unwanted contact with portions of the steering mechanism 26 as can occur, for example, during off-road operation of a vehicle 10.

Figure 4:
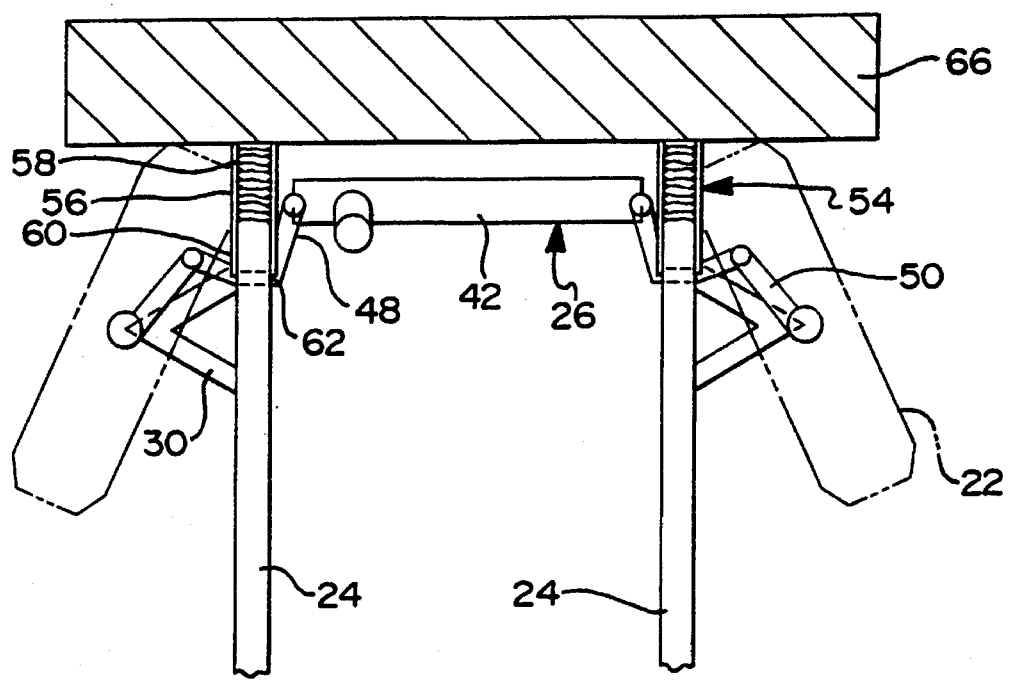
FIG. 4 is a partial diagrammatic view of the vehicle of FIG. 1 illustrating the actuation of the wheel toe device during a collision.
Figure 5:
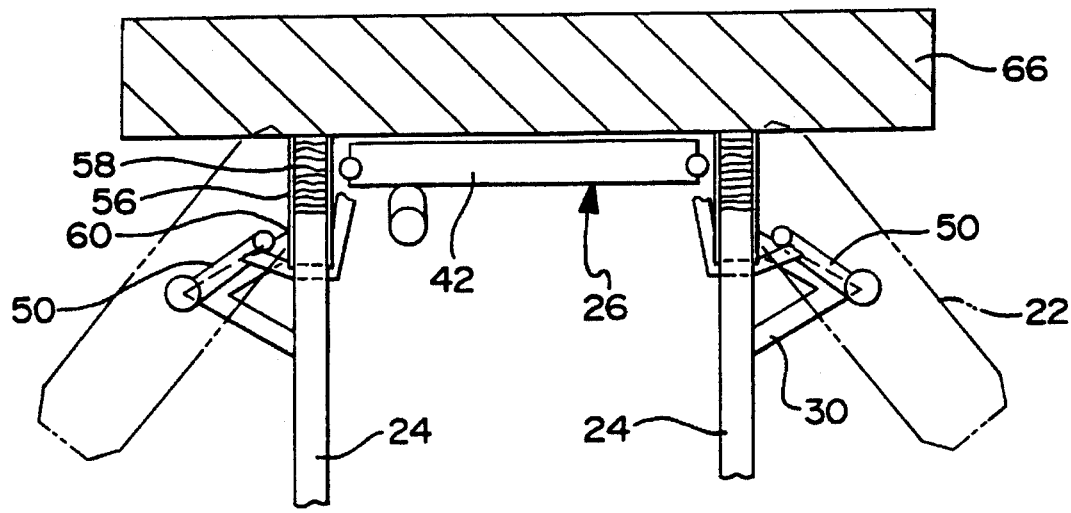
FIG. 5 is a view similar to FIG. 4 illustrating the collision progressing.

Referring now to FIGS. 4 and 5, the operation of the vehicle 10 with the tie rod impact members 54 during a collision of the vehicle 10 with a barrier 66 is illustrated. In FIG. 4, the support rails 24 have begun to deform under the force of the impact, driving the tie rod impact members 54 longitudinally and rearwardly as viewed in the Figures to engage and deform the tie rods 48. This shortens the steering linkage, causing the front wheels 22 to rotate about the vertical axis 52 and toward one another in a toe-in condition. FIG. 5 further illustrates this effect. As a result, the front wheels 22 are thereby substantially prevented from negatively impacting on the collision process and specifically from increasing the rate of deceleration of the vehicle 10 and its occupants as may otherwise occur if the front wheels 22 remain substantially perpendicular to the barrier 66 during the collision.

Accordingly, the vehicle 10 with the wheel toe-in devices 54 of the present invention therefore provides for improved energy dissipation during a collision and minimizes loading on the vehicle 10. Further, the vehicle toe-in devices 54 of the present invention allow greater freedom in the vehicle design process in that shorter overhang distances from the front wheels 22 to the front of the vehicle 10 may be employed resulting in lighter vehicles and concomitant improved fuel economy.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A vehicle comprising:

a vehicle frame having a pair of longitudinally extending support rails disposed in spaced relationship with respect to one another and terminating at one end proximal to a front of said vehicle;

at least one pair of wheels and a steering mechanism operatively connected to said wheels for controlling the direction of said vehicle in response to driver input through said steering mechanism;

said steering mechanism including a pair of tie rods operatively connected to said wheels to control the rotation of said wheels about a vertical axis; and a pair of tie rod impact members fixedly mounted to said support rails and moveable in a direction substantially longitudinally along said support rails in response to a predetermined force acting on said vehicle such that said tie rod impact members engage said tie rods to cause said wheels to rotate about a vertical axis independent of driver input through said steering mechanism.

2. A vehicle as set forth in claim 1 wherein each of said tie rods extend in a direction substantially transverse to one of said support rails, each of said tie rod impact members capable of engagement with one of said tie rods to cause deformation thereof in response to a predetermined force acting on said vehicle to rotate said wheels about the vertical axis.

3. A vehicle as set forth in claim 1 wherein each of said wheels are disposed on opposite sides of said support rails, said tie rod impact members engageable to deform said tie rods to rotate said wheels about the vertical axis and toward one another.

4. A vehicle as set forth in claim 1 wherein said tie rod impact members have a substantially U-shaped body conforming to an underside of said support rails and having forward and rearward ends relative to said vehicle, said rearward end of said body terminating in an arcuate impact surface disposed spaced from said tie rods but aligned so as to engage each of said tie rods causing deformation of same when said tie rod impact members are moved longitudinally along said support rails and rearwardly relative to said vehicle.

5. A vehicle as set forth in claim 4 wherein said body of said tie rod impact members have an increased thickness from said forward end to said rearward end so as to present a ramp underside surface which deflects foreign articles from inadvertent, unwanted contact with portions of said steering mechanism.

6. An automotive vehicle comprising:

a vehicle frame having a pair of longitudinally extending support rails disposed in spaced relationship with respect to one another and terminating at one end proximal to a front of said vehicle;

at least one pair of wheels and a steering mechanism operatively connected to said wheels for controlling the direction of said vehicle in response to driver input through said steering mechanism;

means for rotating said pair of wheels about a vertical axis and toward one another in response to a predetermined force acting on said vehicle independent of driver input through said steering mechanism; and wherein said steering mechanism includes a pair of tie rods operatively connected to said wheels to control the rotation of said wheels about a vertical axis, said means including a pair of tie rod impact members fixedly mounted to said support rails and moveable in a direction substantially longitudinally along said support rails in response to a predetermined force acting on said vehicle such that said tie rod impact members engage said tie rods to cause said wheels to rotate about a vertical axis independent of input through said steering mechanism.

7. An automotive vehicle as set forth in claim 6 wherein each of said tie rods extend in a direction substantially transverse to one of said support rails, each of said wheels are disposed on opposite sides of said support rails, each of said tie rod impact members capable of engagement with one of said tie rods to cause deformation thereof in response to a predetermined force acting on said vehicle to rotate said wheels about the vertical axis and toward one another.

8. An automotive vehicle as set forth in claim 7 wherein said tie rod impact members have a substantially U-shaped body conforming to an underside of said support rails and having forward and rearward ends relative to said vehicle, said rearward end of said body terminating in an arcuate impact surface disposed spaced from said tie rods but aligned so as to engage each of said tie rods causing deformation of same when said tie rod impact members are moved longitudinally along said support rails and rearwardly relative to said vehicle.

9. An automotive vehicle as set forth in claim 8 wherein said body of said tie rod impact members have an increased thickness from said forward end to said rearward end so as to present a ramp underside surface which deflects foreign articles from inadvertent, unwanted contact with portions of said steering mechanism.

10. An automotive vehicle comprising:

a vehicle frame having a pair of longitudinally extending support rails disposed in spaced relationship with respect to one another and terminating at one end proximal to a front of said vehicle;

at least one pair of wheels disposed on opposite sides of said support rails and a steering mechanism operatively connected to said wheels for controlling the direction of said vehicle in response to driver input through said steering mechanism;

said steering mechanism including a pair of tie rods extending transversely and operatively connected to said wheels to control the rotation of said wheels about a vertical axis;

a pair of tie rod impact members fixedly mounted to said support rails and moveable in a direction substantially longitudinally along said support rails in response to a predetermined force acting on said vehicle such that said tie rod impact members engage said tie rods to cause said wheels to rotate about a vertical axis independent of driver input through said steering mechanism;

said tie rod impact members having a substantially U-shaped body conforming to an underside of said support rails and forward and rearward ends relative to said vehicle, said rearward end of said body terminating in an arcuate impact surface disposed spaced from said tie rods but aligned so as to engage each of said tie rods causing deformation of same when said tie rod impact members are moved longitudinally along said support rails and rearwardly relative to said vehicle; and said body of said tie rod impact members having an increased thickness from said forward end to said rearward end so as to present a ramp underside surface.

* * * * *